AUTOMATICALLY CONTROLLED CALCULATING APPARATUS

Filed Aug. 21, 1968

5 Sheets-Sheet 1

Aug. 18, 1970 AN WANG 3,524,970

AUTOMATICALLY CONTROLLED CALCULATING APPARATUS

Filed Aug. 21, 1968 5 Sheets-Sheet 2

AUTOMATICALLY CONTROLLED CALCULATING APPARATUS

Filed Aug. 21, 1968 5 Sheets-Sheet 4

United States Patent Office 3,524,970
Patented Aug. 18, 1970

3,524,970

AUTOMATICALLY CONTROLLED CALCULATING APPARATUS

An Wang, Lincoln, Mass., assignor to Wang Laboratories, Inc., Tewksbury, Mass., a corporation of Massachusetts
Continuation-in-part of application Ser. No. 536,428, Mar. 22, 1966, which is a continuation-in-part of application Ser. No. 398,254, Sept. 22, 1964. This application Aug. 21, 1968, Ser. No. 754,274
Int. Cl. G06k *17/00;* G06f *3/00*
U.S. Cl. 235—61.6 15 Claims

ABSTRACT OF THE DISCLOSURE

An electronic calculator system includes an arithmetic unit, an input register that receives signals from a keyboard and optionally from one or more card readers for transmission to the arithmetic unit. The card readers are pluggably connected in series and each includes interlock control which cooperates with a program counter to channel instruction and numerical data to the arithmetic unit from the card readers through the input register.

SUMMARY OF INVENTION

This application is a continuation in part of my co-pending application Ser. No. 536,428, filed Mar. 22, 1966, entitled "Automatically Controlled Calculating Apparatus," now Pat. No. 3,428,950 which in turn was a continuation in part of my co-pending application Ser. No. 398,254, filed Sept. 22, 1964, entitled "Calculating Apparatus," now Pat. No. 3,402,285.

This invention relates to calculating apparatus of the type which do not employ large data storage capabilities, and more particularly to calculator systems arranged to perform a predetermined sequence of operation in accordance with a removable record.

Current commercial and scientific procedures demand that increasingly large masses of data be processed, and such processing frequently involves or is an integral part of mathematical analyses. Such mathematical analyses encompass in addition to addition, subtraction, multiplication, and division even more complex manipulations, e.g. those employing exponential values. While digital computers of conventional logic organization can perform such manipulations the techniques that are employed frequently involve complex, circuitous and time-consuming operations to obtain the desired results or solutions to specific problems.

The calculator, the principal component of which is an arithmetic unit, provides the basic logic arrangement for performing mathematical manipulations. It is an object of this invention to provide novel and improved arrangements for controlling a calculator. Another object of the invention is to provide novel and improved arrangements enabling logarithmic manipulations to be performed in a calculator logic organization.

The logarithm is a well known tool for simplifying mathematical operations. However, the techniques for utilizing logarithms in calculations have, in general, employed either mechanical devices (analog computers) in the nature of slide rules or similar but more sophisticated devices or stored tables of logarithmic values (e.g. a preset relay matrix) in a digital computer type of device. The analog devices in addition to the speed and accuracy limitations inherent in such devices have characteristics of inflexibility relative to available processing techniques, while the stored table techniques requires tremendous storage capacity which results in large and expensive computer equipment.

Accordingly, it is another object of this invention to provide a novel, improved and compact calculating apparatus which enables more expeditious performance of mathematical manipulations.

Still another object of the invention is to provide a novel and improved calculator logic organization capable of performing computations on a logarithmic basis.

A further object of the invention is to provide novel and improved apparatus for generating logarithms.

A further object of the invention is to provide novel and improved apparatus for generating antilogarithms.

A further object of this invention is to provide a novel and compact calculator which can be programmed to perform complex and extended mathematical operations.

A further object of this invention is to provide a novel and compact calculator programmable through a compact and inexpensive reader capable of sequentially reading data items on an information bearing record.

A further object of this invention is to provide a novel and compact reader capable of sequentially reading an information bearing record.

A further object of this invention is to provide a novel and compact calculator logic organization capable of performing iterative operations automatically.

A further object of this invention is to provide novel and improved record receiving arrangements for use with calculator apparatus.

Still another object of the invention is to provide novel and improved arrangements permitting use of a plurality of record receiving arrangements with a calculator.

A further object of the invention is to provide novel and improved calculator arrangements that facilitate program checking.

In accordance with the invention there is provided an electronic calculator system that includes a register for receiving input data and an arithmetic unit for performing arithmetic operations on the data. A first input means is provided for entering information in the register in response to manually actuated keys. In addition, information may be entered in the register for control of the arithmetic unit by a second input means in the form of a record receiving device in accordance with data on a record inserted in and sensed by the record receiving device. A control unit coordinates the operation of the arithmetic unit and the first and second input means to enable the desired data manipulations to be carried out and responds to one of the keys to actuate the data sensor in the record receiving device.

In particular embodiments of the invention, the arithmetic unit includes means for generating a logarithmic value of the numerical value in the input register in response to actuation of a single manual control button. In this embodiment the logarithmic value is generated by successively multiplying a value in the natural number form by selected constants and correspondingly modifying a logarithmic value by the logarithms of the selected constants, the selected constants being in the form $1 \pm 1/R^A$, where R is the radix and A is an integer. These constants enable the steps in the generation of logarithmic and antilogarithmic values to be performed by shift and addition operations. Logarithmic values are stored in digital form available for immediate and direct manipulation or for transfer to auxiliary temporary storage as desired, in accordance with the nature of the mathematical operations being performed by the calculator.

The record receiving device in these embodiments is adapted to receive record having data items recorded thereon in predetermined, discrete, coordinately related locations. At least some of these data items provide the same arithmetic unit control instructions as instructions provided by some of the keys of the first input means. The record receiving device includes a data item sensor which is coupled to the input register. Control means are provided to cause the sensor to sequentially sense data items recorded on the record in the receiving device and to provide output signals representative of the sensed data item to cause the arithmetic unit to execute a sequence of operations. The control unit includes means responsive to one of the data item output signals to cause the control means to deactuate the data item sensor and means responsive to one of the keys to cause the control means to actuate the data item sensor. Various types of data item sensors may be employed to sense data on records in a variety of forms, for example, magnetically recorded data or data recorded on punched cards.

In particular embodiments of the invention, the record receiving device holds a card in fixed relation to itself, the card having data items encoded in a two-dimensional arrangement. The sensor has a matrix of data item sensors coordinately disposed in locations corresponding to the locations of the data item positions on the card. The control means sequentially actuates the data item sensors under the control of a program counter and the resulting output signals are applied to the arithmetic unit via the input register to cause the execution of a sequence of operations as specified by the data items on the card.

Another feature related to the invention is an arrangement which enables two or more records to be sensed in coordinated sequence. A common program counter is provided and the record receiving devices are sensed in sequence under control of the program counter and means associated with each device for placing that device in operative mode in response to a predetermined program counter signal. This arrangement in a particular embodiment includes program counter storage and card reader storage for use in branching sequences for sub-routine operations and coordination of the operation of the series of card readers.

Also, the preferred embodiment features arrangements responsive to manual keys for rapidly checking an entire program record or for displaying an individual item in the program and the setting of a control counter corresponding to that item for individual program item checks. Apparatus constructed in accordance with the invention enables a wide variety of data manipulations to be performed and provides a compact, easy to operate and versatile system which features coordinated control logic arrangements responsive to either key stroke or to records.

Other objects, features and advantages of the invention will be seen as the following description of particular embodiments thereof progresses, in conjunction with the drawings in which.

DESCRIPTION OF PARTICULAR EMBODIMENTS

Figure 1:
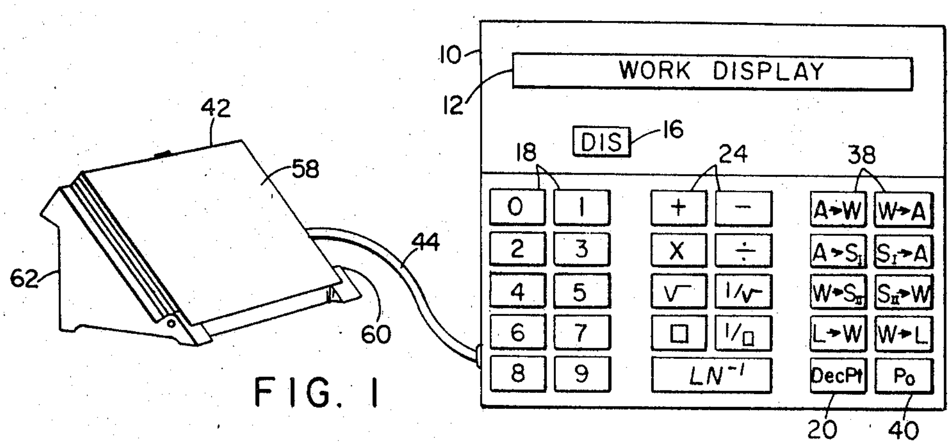
FIG. 1 is a view of a first embodiment of a calculator system including a card reader constructed in accordance with the invention.

There is shown in FIG. 1, a diagrammatic view of a calculator unit 10 that includes a display 12 and manually actuable control keys 16, 18, 20, 24, 38 and 40. Display key 16 when operated causes the contents of work register 14 (FIG. 6) to appear on display 12; numerical keys 18, when operated, enter numerical values in the work register 14; decimal point key 20, when operated, places information in decimal register 22 (FIG. 6); operations to be performed by the arithmetic unit of the calculator are selected by instruction keys 24; keys 38 control transfers between the arithmetic unit and storage registers; and key 40 initiates operation of card reader 42. Specific operations performed in response to these keys are listed in the following two tables:

TABLE I.—TRANSFER KEYS

| Character: | Function |
|---|---|
| $A \rightarrow W$ | Transfer contents of Accumulator Register **26** to Work Register **14.** |
| $W \rightarrow A$ | Transfer contents of Work Register **14** to Accumulator Register **26.** |
| $A \rightarrow S_1$ | Transfer contents of Accumulator Register **26** to Storage I **34.** |
| $S_1 \rightarrow A$ | Transfer contents of Storage I **34** to Accumulator Register **26.** |
| $W \rightarrow S_2$ | Transfer contents of Work Register **14** to Storage II **36.** |
| $S_2 \rightarrow W$ | Transfer contents of Storage II **36** to Work Register **14.** |
| $W \rightarrow L$ | Transfer contents of Work Register **14** to Log Register **28.** |
| $L \rightarrow W$ | Transfer contents of Log Register **28** to Work Register **14.** |

TABLE II.—INSTRUCTION KEYS

| Character: | Function |
|---|---|
| $+$ | Add. |
| $-$ | Subtract. |
| $\times$ | Multiply. |
| $\div$ | Divide. |
| $\sqrt{\phantom{x}}$ | Calculate square root. |
| $1/\sqrt{\phantom{x}}$ | Calculate reciprocal of square root. |
| □ | Calculate square. |
| 1/□ | Calculate reciprocal of the square. |
| $LN^{-1}$ | Generate antilogarithm. |

Figure 5:
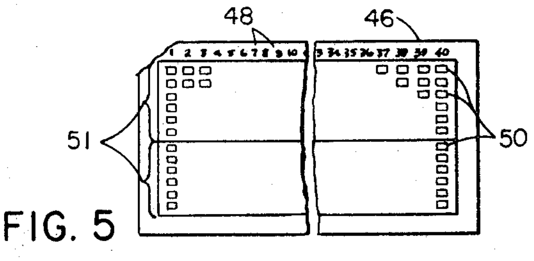
FIG. 5 is a view of a card usable with the calculator system shown in FIG. 1.

Card reader 42 is connected to the arithmetic unit by means of cable 44. A card 46 (FIG. 5) used with this reader has a matrix of prescored positions arranged in forty columns 48 and twelve rows 50. Each column 48 is divided into two groups of six data positions each. Selected pre-scored positions in each group may be punched out, using a pencil for example, to form one or more apertures in the group to define a data item. The six-bit binary code of a data item is sensed by the card reader 42 and applied over cable 44 to the input register of the calculator and provides signals in the same form as they are received from the keys 18, 20, 24, 38 and 40.

In the following chart certain of the commands which may be programmed on card 46 are listed and explained. The number to the left of each command is its representation in octal code. To obtain the corresponding code for punching on a program card, the octal digits are weighted in sequence 40, 20, 10, 4, 2 and 1. For example, the code to start the card reader operation is 42 (100010); and the code to stop the card reader is 26 (010110).

TABLE III.—PROGRAM CODE

| Code | Command | Description |
|---|---|---|
| (00) | Not assigned. | |
| (01) | Prime. | Clear all registers. |
| (02) | $\sqrt{\phantom{x}}$ | Calculate square root. |
| (03) | 1/~ | Calculate reciprocal of square root. |
| (04) | □ | Calculate square. |
| (05) | 1/□ | Calculate reciprocal of square. |
| (06) | X | Multiply. |
| (07) | + | Add. |
| (10) | $LN^{-1}$ | Generate antilogarithm. |
| (11) | − | Subtract. |
| (12) | . | Decimal point. |
| (13) | ÷ | Divide. |
| (14) | 0 | Cardinal numbers. |
| (15) | 1 | |
| (16) | 2 | |
| (17) | 3 | |
| (20) | 4 | |
| (21) | 5 | |
| (22) | 6 | |
| (23) | 7 | |
| (24) | 8 | |
| (25) | 9 | |
| (26) | Stop. | Cease operation. |
| (27) | W→PC | Transfer cottents of first two stages of Work Register 14 to Program Counter 30. |
| (30) | W→DC | Transfer contents of first two stages of Work Register 14 to Decrement Counter 32. |
| (31) | DC→W | Transfer contents of Decrement Counter 32 to first two stages of Work Register 14. |
| (32) | W→A | Transfer contents of Work Register 14 to Accumulator Register 26. |
| (33) | A→W | Transfer contents of Accumulator Register 26 to Work Register 14. |
| (34) | W→L | Transfer contents of Work Register 14 to Log Register 28. |
| (35) | L→W | Transfer contents of Log Register 28 to Work Register 14. |
| (36) | A→$S_1$ | Transfer contents of Accumulator Register 26 to Srorage I 34. |
| (37) | $S_1$→A | Transfer contents of Storage I 34 to Accumulator Register 26. |
| (40) | W→$S_2$ | Transfer contents of Work Register 14 to Storage II 36. |
| (41) | $S_2$→W | Transfer contents of Storage II 36 to Work Register 14. |
| (42) | $P_o$ | Begin program (under Card Reader control). |
| (43) | PDS | Store contents of Decrement Counter 32 in Decrement Counter Store 54 and contents of Program Counter 30 in Program Counter Store 56 and transfer contents of first two stages in Work Register 14 to Program Counter 30. |
| (44) | PDR | Recall the values in Program Counter Store 56 and Decrement Counter Store 54. |
| (45) | DEC | Step Decrement Counter 32 by one unit. |
| (46) | Test DC. | Test DC for zero. |
| (47) | Test A. | Test Accumulator Register 26 for zero. |
| (50) | Test W. | Test Work Register 14 for zero. |
| (51) | Test L. | Test Log Rigister 28 for sign. |

Figures 2, 3:
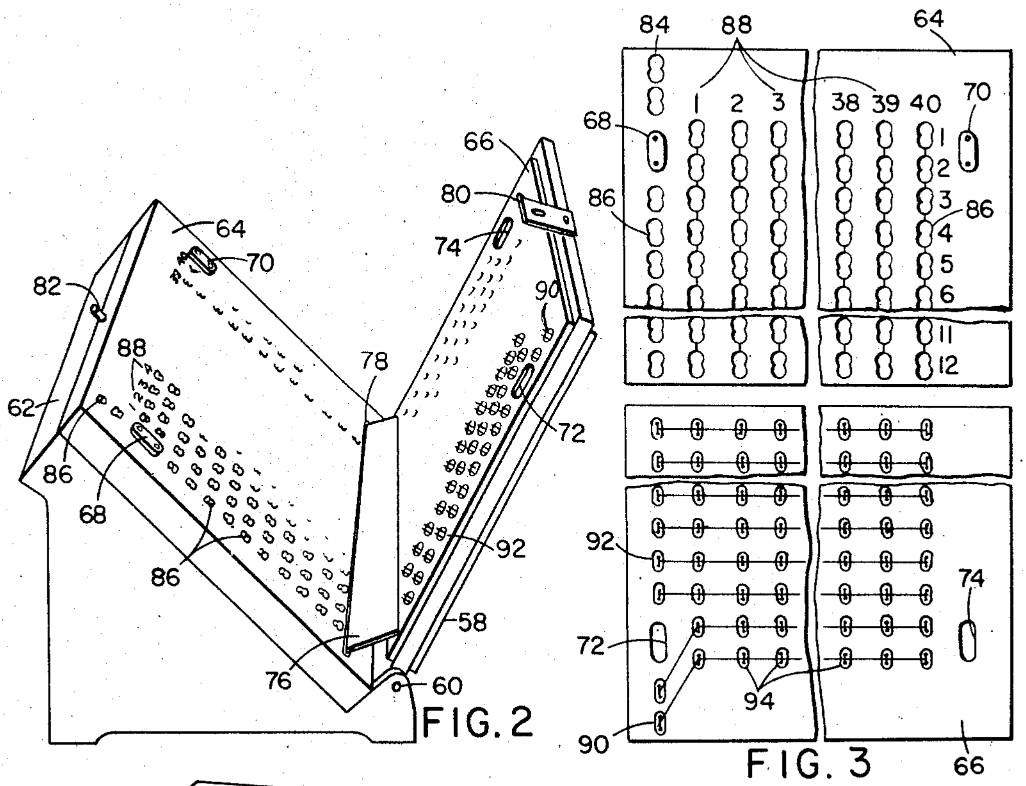
FIG. 2 is a perspective view of the card reader shown in FIG. 1, in open position.
FIG. 3 is a schematic diagram of the contacts in the cover and base of the card reader shown in FIG. 1.

Card reader 42 is shown in more detail in the open position in FIG. 2. A cover 58 is attached by hinges 60 to base 62. Card Reader 42 is designed to receive card 46 between face 64 of the base and face 66 of the cover. The card will be aligned laterally by vertical front guide 68 and vertical rear guide 70 which are received by front recess 72 and rear recess 74 in cover 58 permitting faces 64 and 66 to meet flush with the card between them. The card is held vertically in position by means of stop 76 which also acts as a limiting device on the movement of cover 58; stop 76 moves into slot 78 in base 62 as the cover is closed causing no impediment to the previously mentioned flush relation of faces 64 and 66. Latch 80 and pin 82 serve to secure the cover in the closed position.

Face 64 contains a column 84 of twelve kidney shaped flat contacts 86 outside the card sensing area. In the card sensing area there is a matrix 88 of forty columns of contacts each containing twelve kidney shaped flat contacts 86 arranged on face 64 to correspond to positions to be read on Card 46, as can be seen more readily in FIG. 3.

Face 66 contains a column 90 of twelve pairs of prong contact elements 92. Column 90 is disposed so that each of its pairs of prongs 92 will contact and complete an electrical circuit with a corresponding kidney shaped contact 86 in row 84 when cover 58 is closed. A matrix 94 of forty columns, each containing twelve pairs of prong contact elements 92, are arranged on the remainder of face 66 to correspond to positions to be read on a card. The contacts in matrix 94 are disposed so that each one of the pairs of prongs 92 will contact a corresponding kidney shaped contact 86 in group 88 when cover 58 is closed, unless the corresponding data position on an interposed card has not been punched.

The forty pairs of prongs 92 in each of the twelve separate rows in matrix 94 are connected in series and are connected to a corresponding one of the twelve prongs in column 90. The kidney shaped contacts 86 in each of the eighty separate columns in matrix 88 are connected together in groups of six to an input line in cable 88 and are not connected directly to any of the contacts in column 84. The contacts in column 84 are divided in two identical groups of six and are connected to six corresponding output lines in cable 44.

When any particular group of sensors (a column of six) of a card in the Card Reader 42 is desired to be read, that column of six contacts in matrix 88 will be energized. Any positions in that column which coincide with a punched position in the corresponding column on the card will be in contact with a pair of prongs at the corresponding row and column position of matrix 94. Since all forty pairs of prongs in each row of group 94 are in series, a signal appearing at any position in a row will pass through that row to a corresponding pair of prongs in column 90 and from there via the corresponding contact 86 in column 84 to the corresponding output line.

Figure 4:
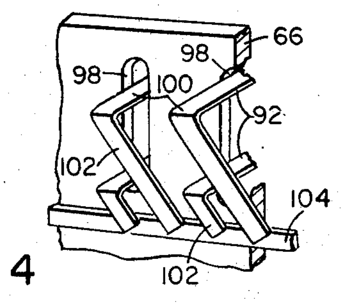
FIG. 4 is an enlarged view of the contacts in the cover of the card reader shown in FIG. 1.

A more detailed showing of a pair of prongs is shown in FIG. 4. Each pair of prongs 92 protrudes from cover 40 through an aperture 98 in face 66. Each prong 100 is formed integrally with a strap 102 of spring like material which acts to bias its respective prong 100 outwardly through aperture 98. Strap 102 is fastened to bus bar 104 which serves as a mounting for and electrically connects the prongs in each row.

Figure 6:
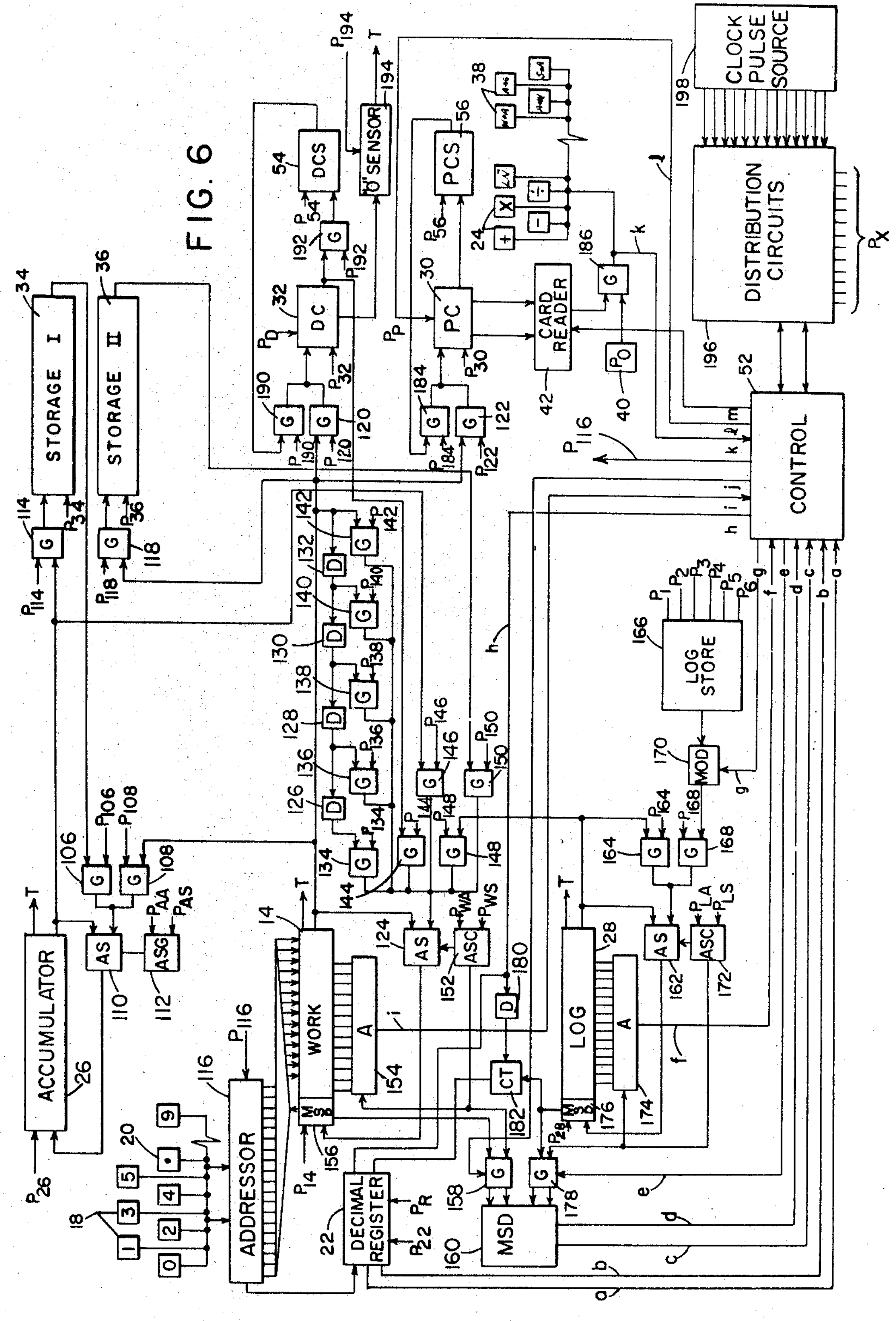
FIG. 6 is a block diagram of the calculator system shown in FIG. 1.

A block diagram of a calculator system embodying the present invention is shown in FIG. 6. Accumulator 26 is a ten digit position shift register for operation in a binary coded decimal radix, thus each "position" is actually four bits. The most significant digit position is at the left and the least significant digit position is at the right of Accumulator Register 26. Work Register 14, Log Register 28 and Storage Registers 34 and 36 are of the same type as Accumulator Register 26; the entire arithmetic portion of the system operates in the binary coded decimal radix. Accumulator 26 may accumulate the sum of, or the difference between, a value which it contains and one supplied from Storage 34 via Gate 106 or from Work Register 14 via Gate 108. Adder-Subtractor 110, conditioned to add or subtract by Add-Subtract Control 112, receives the output digit of the least significant stage of Accumulator 26 at one of its inputs and receives at its other input a second digit from whichever of Gates 106 or 108 is enabled and presents the result digit to the input (most significant) stage of the Accumulator; Gate 106 is enabled by a signal at $P_{106}$ and Gate 108 by a signal at $P_{108}$. Add-Subtract Control 112 will condition Adder-Subtracter 110 to add if a signal is received at $P_{AA}$ or subtract if a signal is received at $P_{AS}$. Accumulator 26 may be shifted by the application of a pulse at $P_{26}$. The digits in Storage 34 may be shifted by application of a pulse at $P_{34}$ and information entered into it through Gate 114 by applying an enabling signal at $P_{114}$.

Information represented by Numeral Keys 18 is entered in Work Register 14 by Addressor 116. Similar numerical data received from Card Reader 42 is presented to Addressor 116 at $P_{116}$. Each time a Numeral Key 18 is depressed a binary one is stepped through Decimal Register 22 until Decimal Point Key 20 is depressed. At that time the stepping of Decimal Register 22 ceases and the position of the decimal point in the entered number is recorded.

Work Register 14 provides signals to Accumulator 26 via Gate 108, to Storage 36 via Gate 118, to Decrement Counter 32 via Gate 120, to a Program Counter 30 via Gate 122 and provides two inputs to its associated Adder-Subtracter 124. One of the inputs is connected directly to Adder-Subtracter 124 while the second input, originating at the same output of Work Register 14, may be directed through none, one or more of the Delays 126, 128, 130, and 132 depending upon which one of Gates 134, 136, 138, 140 or 142, is enabled by a signal at $P_{134}$, $P_{136}$, $P_{138}$, $P_{140}$ or $P_{142}$, respectively. The second input to Adder-Subtracter 124 may also receive a signal from Decrement Counter 32 via Gate 144 enabled by a signal at $P_{144}$, from Accumulator 26 via Gate 146 enabled by a signal at $P_{146}$, from Log Register 28 via Gate 148 enabled by a signal at $P_{148}$, or from Storage 36 via Gate 150 enabled by a signal at $P_{150}$. Work Register 14 receives information from Adder-Subtracter 124 and is shifted by a signal at $P_{14}$. The four Delays 126, 128, 130 and 132 provides a means for presenting the value stored in Work Register 14 to Adder-Subtracter 124 shifted by one, two, three or four positions depending upon which gate is enabled. Any number of delays may be used dependent upon the capabilities desired for a particular machine.

Add-Subtract Control 152 will condition Adder-Subtracter 124 to add if a signal is received at $P_{WA}$ or to subtract if a signal is received at $P_{WS}$. AND circuit 154 monitors a number of stages, other than the Most Significant Digit Stage (MSD) 156, of Work Register 14 in accordance with the accuracy desired in the calculations and will respond to an all-zero input when Add-Subtract Control 152 directs subtraction and to an all-nines input when it directs addition. The output of AND circuit 154 is applied to the Control 52 of the calculator via line *i*.

Add-Subtract Control 152 also applies a signal to Gate 158 along with one from MSD 156. Both signals will be presented to the Most Significant Digit Sensor (MSD Sensor) 160 when Gate 158 is enabled by a signal on line *j* from Control 52 which is present when the logarithm of a number in Work Register 14 is being accumulated in Log Register 28. With Add-Subtract Control 152 directing addition MSD Sensor 160 will be conditioned to seek a one in MSD 156, while a subtract direction will condition MSD Sensor 160 to seek a zero in MSD 156.

The accumulation of the logarithm of a number in Work Register 14 is accomplished in Log Register 28 through Adder-Subtracter 162. Log Register 28 is shifted by a signal at $P_{28}$ and provides outputs to Work Register 14 via Gate 148, to one input of associated Adder-Subtracter 162 and to second input of Adder-Subtracter 162 via Gate 164 enabled by a signal at $P_{164}$. A second input to Adder-Subtracter 162 is provided by Log Store 166 via Gate 168 enabled by a signal at $P_{168}$. Log Modifier 170 may be caused to operate on a logarithm from Log Store 166 en route to Gate 168. For example, it may double the logarithm when the □ (square) Key 24 has been depressed, or halve the logarithm when the $\sqrt{\ }$ (square root) Key 24 has been depressed, upon the proper instruction from Control 52 over line *g*. Log Store 166 contains the logarithms to be used by the calculator, which may be read out by providing a signal at the appropriate one of lines $P_1$, $P_2$, $P_3$, $P_4$, $P_5$ and $P_6$. The specific embodiment here uses only six logarithm values, as will be discussed infra, but it is apparent that should greater accuracy be desired additional ones may be employed.

Log Store 166 stores the logarithmic values of pre-established constants which are related to the radix of the number system to be employed in the calculator and may be related to any desired base, for example the base 10. In this calculator the base *e* is employed and the constants are as follows:

TABLE IV.—LOGARITHMS AND CONSTANTS EMPLOYED

| Mode | Constant | Log |
|---|---|---|
| 1 | 10 | 2.302585093 |
| 2 | 2 | .693147181 |
| 3 | .9 | .105360516 |
| 4 | 1.01 | .009950331 |
| 5 | .999 | .001000500 |
| 6 | 1.0001 | .000099995 |

It will be noted that the last four constants are in the form $1\pm1/R^A$ where R is the radix and A is, successively, the integers 1, 2, 3, and 4. Each logarithm read out of Log Store 166, as directed by Control 52, is applied to Adder-Subtracter 168 to modify the contents of register 28 in an addition or subtraction operation, also as controlled by Control 52. Control 52 also causes the contents of Work Register 14 to be modified in multiplication and division operations by the constants. These modification operations, while coordinated, may be performed in various manners, for example at substantially the same time or one modification operation may be completed and the other then commenced and performed as a function of the first.

Add-Subtract Control 172 will condition Adder-Subtracter 162 to add if a signal is received at a $P_{LA}$ or to subtract if a signal is received at $P_{LS}$. AND circuit 174 monitors a number of stages, other than the Most Significant Digit Stage (MSD) 176, of Log Register 28 in accordance with the accuracy desired in the calculations and will respond to an all-zero input when Add-Subtract Control 172 directs subtraction and to an all-nines input when it directs addition. The output of AND circuit 174 is applied to Control 52 via line *f*.

Add-Subtract Control 172 also applies a signal to Gate 178 along with one from MSD 176. Both signals will be presented to MSD Sensor 160 when Gate 178 is enabled by a signal on line *e* from Control 52 which is present when antilogarithm of a logarithm in Log Register 28 is being accumulated in Work Register 14. With Add-Subtract Control 172 directing addition MSD Sensor 160 will be conditioned to seek a one in MSD 176 while a subtract direction will condition MSD Sensor 160 to seek a zero in MSD 176.

At certain predetermined times, such as the division by ten operation effected in the first mode of the generation of a log of a number, Control 52 provides a signal at $P_{22}$ which causes an interrogation of the most significant position of Decimal Register 22 for the presence or absence of the decimal point which information is then communicated to Control 52. If an antilogarithm is to be assembled by the machine a signal from Control 52 will remove any decimal point in Decimal Register 22. Through Delay 180 the same signal will cause the Characteristic Transfer Gate 182 to transfer the characteristic which is in MSD stage 176 to Decimal Register 22. Decimal Register 22 is a binary coded decimal register as is Log Register 28 thus allowing for direct transfer between the two.

Program Counter 30 may receive an input from Work Register 14 via Gate 122 or from Program Counter Store 56 via Gate 184 enabled by a signal at $P_{184}$. Program Counter 30 is shifted by a signal at $P_{30}$ and stepped by a signal at $P_p$; Program Counter Store 56 is shifted by a signal at $P_{56}$. The PDS command, code (43), shown in Table III transfers the contents of Decrement Counter 32 to Decrement Counter Store 54; and transfers the contents of Program Counter 30 to Program Counter Store 56 while also transferring the numbers in the two most significant positions in Work Register 14 to Program Counter 30. The values thus removed may be replaced in Program Counter 30 and Decrement Counter 32 by employing the PDR command, code (44).

Decrement Counter 32 may receive an output from Work Register 14 via Gate 120 or from Decrement Counter Store 54 which appears through Gate 190 enabled by $P_{190}$. Values in Decrement Counter 32 may be decremented by a signal at $P_D$ and shifted by a signal at $P_{32}$. A signal destined for Decrement Counter Store 54 must pass through Gate 192 enabled by $P_{192}$; data is shifted through Decrement Counter Store 54 by signals applied at $P_{54}$.

Decrement Counter 32 is used to count the number of times an iterative operation has been performed. If, for example, a particular operation is to be carried out M times, the number M may be loaded in Decrement Counter 32 and decreased by one each time the operation is performed continuing the backward counting until zero remains. After each iteration "0" Sensor 194 is tested to see if the count has been reduced to zero; if a zero is not found the system is directed to begin again at the initial step of the operation.

Associated with Control 52 is Clock Pulse Source 198 which provides the signals to Distributor Circuits 196 which Control 52 directs throughout the system as enabling and shifting signals. Additional information as to the nature and operation of this calculator apparatus may be had with reference to U.S. Pat. 3,428,950.

The calculator of the invention performs a variety of mathematical manipulations. Simple addition and subtraction operations are accomplished by accumulating the sum or difference in Accumulator 26. Other manipulations are accomplished by operating with the logarithms of the numbers involved. Since the logarithms of only a group of preselected constants, e.g., Table IV, are stored in the system, the logarithm of each number involved is generated prior to performance of operations such as multiplication or division. The apparatus for generating logarithms will be more readily understood by reference to Table V which describes in tabular form the generation of a logarithm.

TABLE V.—OPERATION TO GENERATE A LOGARITHM (1) A number is entered in Work Register (WR) 14 under the control of the Numeral Keys 18 or the Card Reader (CR) 42.

(2) The multiply instruction is conducted to Control 52 via line *k* either by depressing the Multiply (X) Key or through CR 42. This initiates the series of manipulations indicated in Table IV.

(3) Mode 1 (Table IV) senses the position of the decimal point and begins by Control 52 presenting an interrogating signal to Decimal Register (DR) 22 at $P_R$. A signal will appear on line *a* if the decimal point is not present in the most significant position of DR 22 and on line *b* if it is.

(4) A signal appearing on line *a* causes Control 52 to present a basic cycle of signals to the system (generated by Clock Pulse Source 198 and distributed by Distribution Circuits 196). A signal is routed to $P_{22}$ shifting the decimal point one position toward the most significant stage of DR 22, thereby effectively dividing the value in WR 14 by a value of ten, to $P_{LA}$ placing Add-Subtract Control (ASC) 172 and AND circuit 154 in the addition state, and to $P_{168}$ enabling Gate 168. A series of ten signals are routed to $P_1$ and $P_{28}$ combining, negatively, the log of 10 in Log Store (LS) 166 with the value (initially zero) in Log Register (LR) 28 through Adder-Subtracter (AS) 162 and accumulating their sum in LR28. A pulse will now cause Control 52 to interrogate DR 22 as to the position of the decimal point. If it is not present in the most significant position a signal will appear on line *a* and cause the foregoing operation to be repeated until the decimal point is at the most significant position (the number in WR 14 has an effective value of less than one).

(5) When the decimal point is present at the most significant position a signal will appear on line *b* initiating operation in mode 2, Table IV. Control 52 now presents a signal at $P_{WA}$ setting ASC 152 to the addition state and ASC 172 receives a signal at $P_{LS}$ setting it to the subtraction state. A signal will now appear on line *c* if the value in MSD 156 is a one or on line *d* if the value is a zero.

(6) A signal appearing on line *d* causes Control 52 to present a basic cycle of signals to the system. Signals are applied to $P_{14}$ and $P_{142}$ causing each digit in WR 14 to be applied to both inputs of AS 174 thus adding the value in WR 14 to itself; in a doubling operation $P_2$, $P_{28}$, $P_{164}$ and $P_{168}$ also receive signals causing each digit in LR 28 to have subtracted from it the corresponding digit of the log of 2 through operation of AS 162. Thus, the log of two is subtracted from the value in LR 28. The condition of lines *c* and *d* will now be checked. If the value in MSD 156 is still zero a signal on line *d* will cause Control 52 to repeat the operation. If a one is found a signal will appear on line *c* initiating mode 3, Table IV.

(7) A signal on line *c* causes a signal at $P_{LA}$ setting ASC 172 to the addition state and a signal at $P_{WS}$ setting ASC 152 to the subtraction state. Since a one is present in MSD 156 a signal will appear on line *d* causing a series of ten signals to be presented at $P_{14}$ and $P_{140}$, thus subtracting from the number in WR 14 a once shifted value of that number and effectively multiplying it by nine tenths. Simultaneously, signals are applied at $P_{28}$, $P_{164}$, $P_{168}$ and $P_3$ shifting the log of 0.9 out of LS 166 and adding it to the value in LR 28. The condition of lines *c* and *d* are next checked and if the value in MSD 156 is still not zero a signal on line *d* causes the operation to be repeated. If it is zero, a signal will appear on line *c* initiating mode 4, Table IV.

(8) A signal on line *c* now causes $P_{WA}$ and $P_{LS}$ to receive signals conditioning ACS's 152 and 172 to the addition state and subtraction state, resectively. A zero being present in MSD 156, a signal will appear on line *d* causing signals to be applied at $P_{14}$ and $P_{138}$, thus adding the number in WR 14 to a twice shifted value of itself and effectively multiplying that number by 1.01, $P_{28}$, $P_{164}$, $P_{168}$ and $P_4$ are simultaneously provided with signals thereby subtracting the log 1.01 from the value in LR 28. Lines *c* and *d* are next checked and if a zero is still present in MSD 156 a signal on line *d* causes the operation to be repeated. If a one is now present, a signal on line *c* initiates mode 5, Table IV.

(9) A signal on line *c* now causes $P_{LA}$ and $P_{WS}$ to receive signals conditioning ASC's 172 and 152 to the subtraction state and addition state, respectively. A one being present in MSD 156, a signal will appear on line *d* causing signals to be applied at $P_{14}$ and $P_{136}$, thus subtracting from the number in WR 14 a thrice shifted value of that number and effectively multiplying it by 0.999. Simultaneously, signals are applied at $P_{28}$, $P_{164}$, $P_{168}$ and $P_5$ shifting the log of 0.999 out of LS 166 and adding it to the value in LR 28. Lines *c* and *d* are checked and if the value in MSD 156 is still not zero a signal on line *d* causes the operation to be repeated. If it is a zero, a signal will appear on line *c* initiating mode 6, Table IV.

(10) A signal on line *c* now causes $P_{LS}$ and $P_{WA}$ to receive signals conditioning ASC's 172 and 152 to the addition state and subtraction state, respectively. A zero being present in MSD 156, a signal will appear on line *d* causing signals to be applied at $P_{14}$ and $P_{134}$, thus adding the number in WR 14 to a four times shifted value of itself and effectively multipling it by 1.0001. Simultaneously, signals are applied at $P_{28}$, $P_{164}$, $P_{168}$ and $P_6$ shifting the log of 1.0001 out of LS 166 and subtracting it from the value in LR 28. Lines *c* and *d* are next checked and if the value in MSD 156 is still not one, a signal on line *d* causes the operation to be repeated. If it is a one, a signal will appear on line *c* thus ending the operation and, if the system is under control of CR 42, presenting a signal at $P_p$ to step Program Counter 30.

An example of this operation applied to a particular number is indicated in Table VI where the steps using the six modes of Table IV to generate the log to the base *e* of the number 2.10 by this apparatus are set forth.

TABLE VI.—GENERATING THE LOG OF 2.1

| Mode | Constant applied | Register 14 | Register 28 |
|---|---|---|---|
| | | 2.100000 | 0.00000 |
| 1 | 10 | .210000 | 2.30259 |
| 2 | 2.0 | .420000 | 1.60944 |
| 2 | 2.0 | .840000 | .91629 |
| 2 | 2.0 | 1.680000 | .22314 |
| 3 | 0.9 | 1.512000 | .32850 |
| 3 | 0.9 | 1.360800 | .43389 |
| 3 | 0.9 | 1.224720 | .53922 |
| 3 | 0.9 | 1.102248 | .64458 |
| 3 | 0.9 | .992024 | .74994 |
| 4 | 1.01 | 1.001944 | .73999 |
| 5 | 0.999 | 1.000943 | .74099 |
| 5 | 0.999 | .999943 | .74199 |
| 6 | 1.0001 | 1.000042 | .74189 |

If multiplication is to be performed, the multiplier is loaded into Work Register 14 and the logarithm of this quantity is generated in the same manner as described above, thus that quantity is added to the log value already stored in the Log Register 28. If division is to be performed, the steps of generating the logarithm of the second number are performed in complement sequence so that that quantity is effectively subtracted from the value stored in the Log Register 26.

When it is desired to obtain the natural number from a logarithm (antilog), the steps are reversed with the Work Register 14 being set initially to the value 1.0, Log Register 28 containing the logarithm of the value to be set into Work Register 14. A signal from Control 52 will clear Decimal Register 22, and that signal, applied through Delay 180, will cause Characteristic Transfer Gate 182 to transfer to Decimal Register 22 the position of the decimal point as represented by the value of the characteristic of the logarithm in Log Register 28. Subsequent steps are now performed in the same manner as set forth above for generating the log.

A simple program to calculate the value $6^2+4\times2$ would be set up as in Table VII.

TABLE VII.—EXAMPLE PROGRAM

| Step | Code | Command | Remarks |
|---|---|---|---|
| 00 | (22) | 6 | Load 6 in WR 14. |
| 01 | (04) | W□ | Logarithm of 6 is generated, doubled, and the antilog is taken and placed in WR 14. |
| 02 | (32) | W—→A | Transfer value in WR 14 to AR 26. |
| 03 | (20) | 4 | Load 4 in WR 14. |
| 04 | (07) | + | Add value in WR 14 to value in AR 26. |
| 05 | (33) | A—→W | Transfer value in AR 26 to WR 14. |
| 06 | (06) | X | Generate log of value in WR 14 accumulating it in LR 28. |
| 07 | (16) | 2 | Load 2 in WR 14. |
| 08 | (06) | X | Generate log of value in WR 14 accumulating it in LR 28. |
| 09 | (10) | LN⁻¹ | Take antilog of value in LR 28. |
| 10 | (26) | STOP | Cease operations. |

Figure 7:
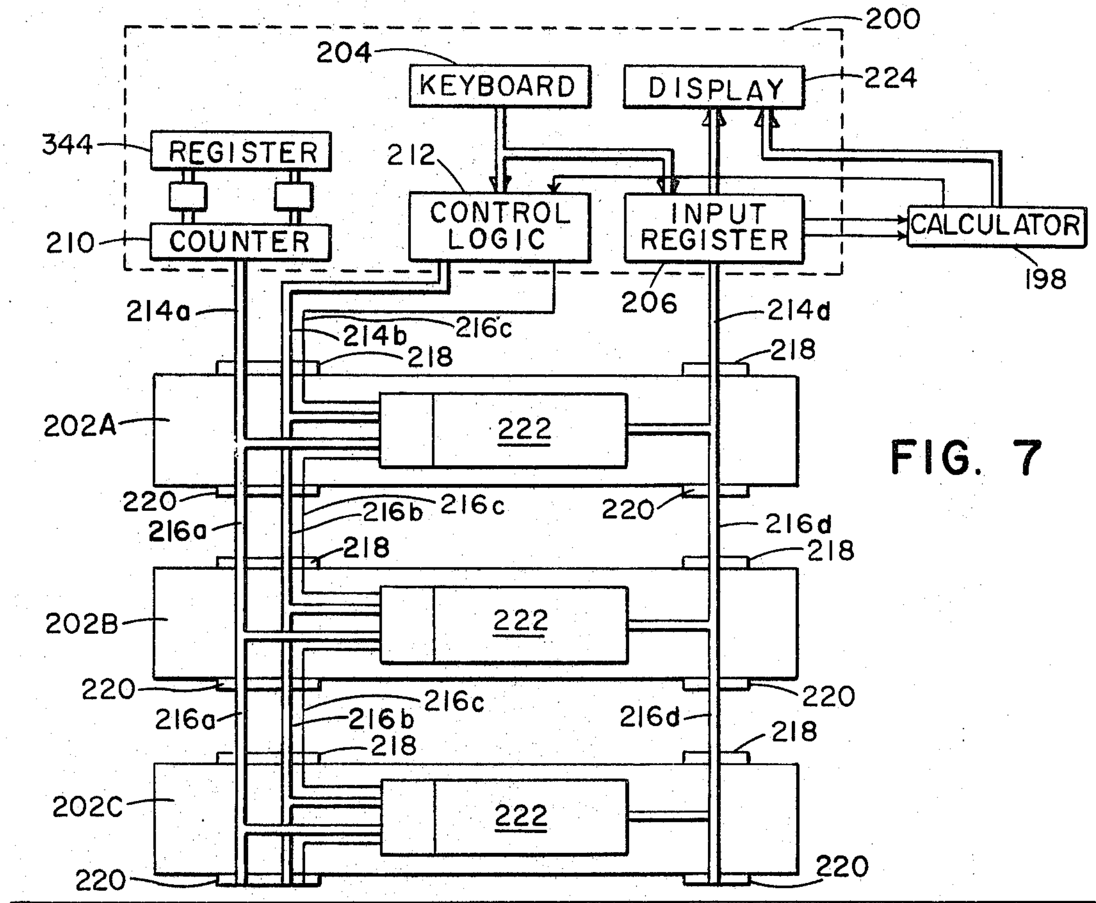
FIG. 7 is a block diagram of another form of calculator system constructed in accordance with the invention which employs three card readers.

In a second embodiment of the invention, a calculator 198 of the type disclosed in copending application Ser. No. 588,863, filed Oct. 24, 1966, entitled "Calculator" and assigned to the same assignee as this application is used in conjunction with a keyboard unit 200 and one or more card reader units 202 (three card reader units being illustrated in FIG. 7). The calculator unit 198 performs mathematical and data manipulating operations of the type described in connection with the embodiment shown in FIGS. 1–6 in response to single keystroke commands from the keyboard 204 (illustrated in FIG. 8). This keyboard enters data and instructions into the calculator unit via a six bit input buffer register 206. In addition, data may be transferred between the calculator and IO devices through buffer register 206 via cable 208. A selected card reader 202 also may enter data into the calculator via the input buffer register 206. A counter 210, in conjunction with control logic 212 which responds to signals from the keyboard unit 200 and calculator 198, provides control signals over cable 214 to the first card reader and via interconnecting cables 216 to the subsequent card readers in series. The input cable 215 is connected to the first card reader 202A by input pluggable connection 218 while the interconnecting cables 216 are connected between an output pluggable connection 220 of the card reader and an input pluggable connection 218 of the next card reader. The card readers 202 are turned on in sequence, one at a time, under the control of the control logic by signals over cable lines **214*b* and *c*, 216*b* and *c*. An address signal specified by program counter 210 is applied over cable lines 214*a* and 216*a* to the diode matrix 222 which is actuated under the control logic 212 to read from that address the data item as indicated by the card 46 in that card reader. The output data item is applied over cables 214*d*, 216*d* to the input register 206 for control of the calculator. A display unit 224 in the keyboard unit responds to either signals from the calculator 198** or to signals indicative of a particular data item at a specified card reader address. The card reader logic organization, together with the control logic enables branching to a specified card reader address and return to continue the main program after a subroutine has been completed. Also, program verification may be obtained in response to a single keystroke which checks the accuracy of a program or the proper positioning of a program card in a card reader.

Figure 8:
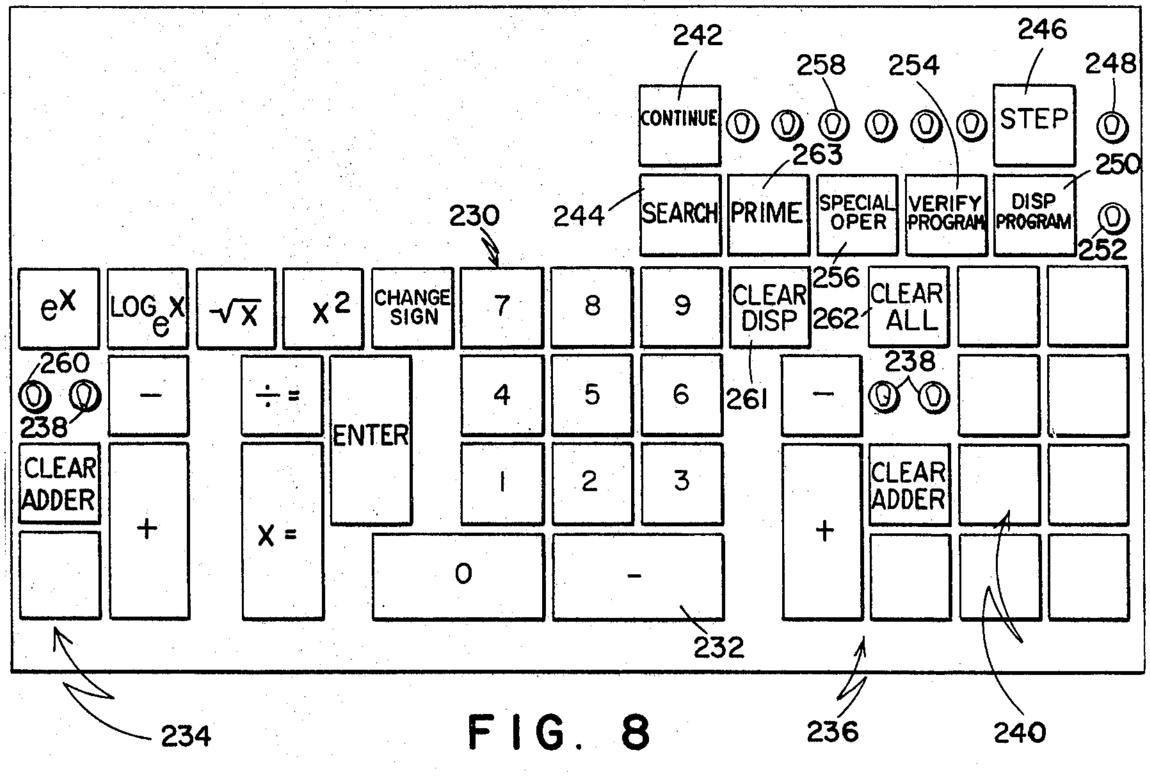
FIG. 8 is a view of the keyboard unit employed with the calculator system shown in FIG. 7.

The keyboard 204, shown in FIG. 8, includes a set of ten numerical keys 230; a decimal point key 232; two groups of arithmetic operation control keys 234, 236 (permitting independent control of left and right adder units in the calculator 198); three arithmetic unit control switches 238 (which permit accumulation of particular data results—a feature useful in tabulating operations); a set of eight storage register control keys 240; a continue (start) card reader operation key 242; a search initiating operation key 244; a program counter step key 246 which is used in conjunction with switch 248; a display program key 250 which is used in conjunction with switch 252; a verify program key 254; a special operation key 256 which is used in conjunction with switches 258; and general control switches and keys 260–263.

Program codes, in addition to those set forth in Table III, used in this card reader include:

| Code | Command | Description |
|---|---|---|
| (52) | Search | Branch in program. |
| (53) | Search and return | Branch to subroutine. |
| (54) | Return | Return from subroutine. |
| (55) | Mark | Flag for destination of search. |

Figure 9:
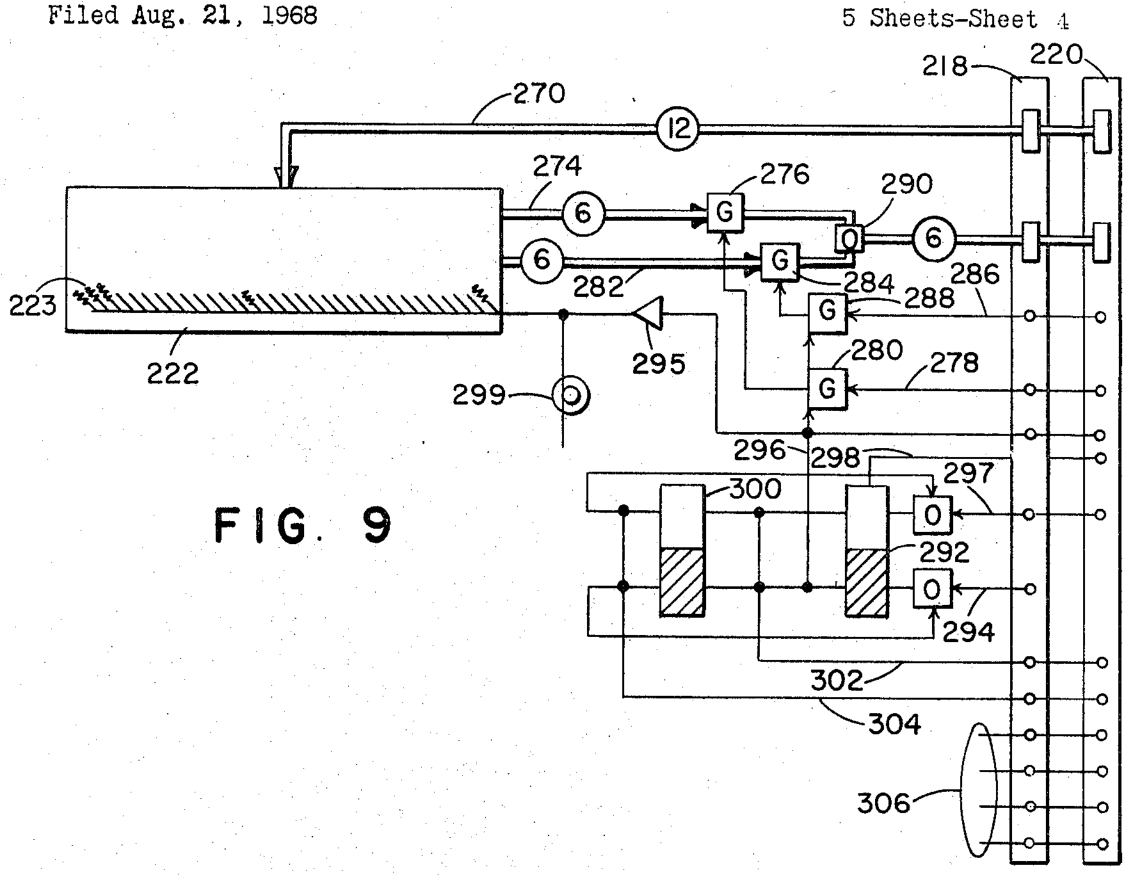
FIG. 9 is a logic diagram of one of the card readers shown in FIG. 7.

A logic diagram of the card reader 202 is shown in FIG. 9. Input and output signals to the card reader are applied through pluggable connection 218 for control of reading a card disposed in the card reader. The holes in the card allow selective completion of circuits in the diode matrix 222. Input addressing signals from the counter 210 are applied over twelve conductors 270 to the diode matrix. Output lines 274 from the upper section of the matrix are connected to gate 276 which is conditioned by a signal over input lines 278 from the reset side of the most significant stage of the program counter 210 as passed by control gate 280. Similarly, output lines 282 from the lower section of matrix 222 are connected to gate 284 that is conditioned by the set signal from the most significant stage of the program counter 210 via line 286 as passed by control gate 288. The signals passed by the conditioned gate 276 or 284 are passed by OR circuit 290 for application over cable **214*d* to the input register 206**.

The operation of each card reader is under the control of a main flip flop 292 which is set in response to a signal on line 294 and in set condition produces an output level on line 296 to condition gates 280 and 288 and is also applied through amplifier 295 to light indicator lamp 299 and to energize the anode resistors 223 of the diode matrix 222 so that that matrix will produce output signals in response to addressing signals from the program counter 210. Flip flop 292 is reset by a signal on line 297 and this resetting operation produces an output pulse on line 298 which is applied to the output connector unit 220 for application via cable 216 to the input line 294 in the control unit of the next card reader in the sequence. Also included in the control circuit is a storage flip flop 300 which stores the setting of flip flop 292 in response to a signal on line 302. The setting stored in flip flop 300 is returned to flip flop 292 in response to a signal on line 304. In addition, power supply signals are applied to the card reader over the four conductors in group 306. It will be noted that all of the pluggable connections at input connector 218 are connected to output connector 220 with the exception of the flip flop setting signal on line 294 (which is applied only to the input connector 218) and the output signal on line 298 (produced on resetting of flip flop 292) which is applied only to the output connector 220.

The card readers employed in this system are similar to the card readers 42 and receive similar cards 46. Other types of record receiving devices of course may be utilized in the practice of the invention. The diode matrix 222 (divided in upper and lower sections) is housed within the base component 62 and decodes the address signals applied on lines 270 and applies the decoded signals to output lines 274, 282 as a function of the holes in the card positioned in the reader. It will be seen that corresponding address in the upper and lower sections of the card produce output signals on output lines 274, 282 simultaneously and the desired group of output signals is selected on the basis of the state of the most significant stage of the program counter 210 for application through OR circuits 290 and over cable section **214*d* to the input register 206. The principal differences between the card reader shown in FIGS. 1–3 and the card readers employed in this embodiment are the incorporation of the control logic, a provision of input and output pluggable connectors, and provision of an indicator element 299** on the card reader housing.

Figure 10:
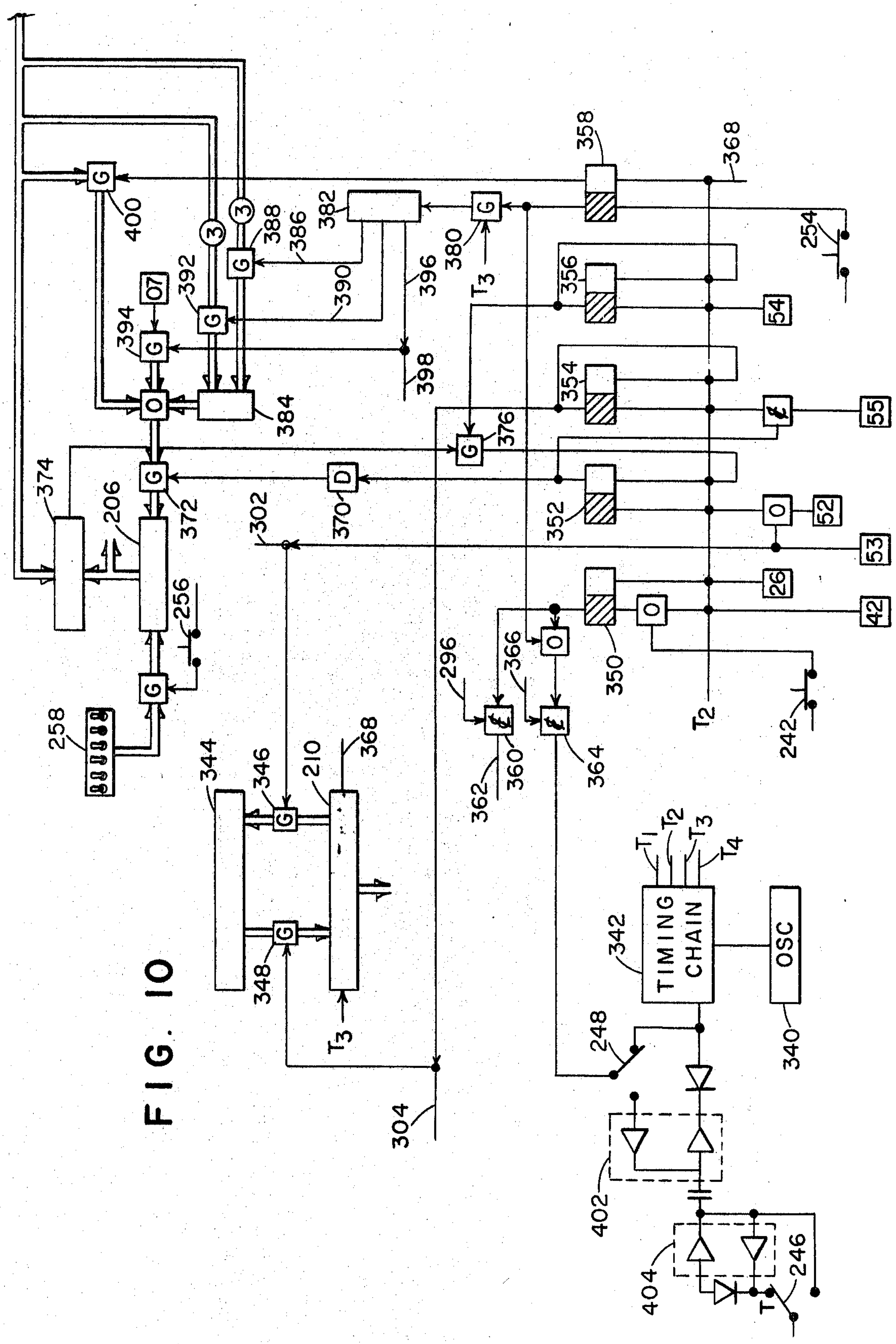
FIG. 10 is a logic diagram of a portion of the logic included in the keyboard unit shown in FIG. 7.

A schematic diagram of control logic 212 is shown in FIG. 10. That control logic is responsive to either codes in input register 206 or keystrokes of the keys in the keyboard 204. Oscillator 340 applies outputs to timing chain circuit 342, which circuit produces a series of output pulses T1–T4 that synchronize the channelling of information to and from the calculator 198 between the card readers 202 and the keyboard 204. A storage register 344 is connected to receive the contents of counter 210 via gates 346 and to return the stored contents to the counter 210 via gates 348. A series of control flip flops are included in the control logic including a main control flip flop 350, a search control flip flop 352, a return control flip flop 354, a mark control flip flop 356, and a verify program control flip flop 358. In general, the control flip flops are actuated by gating a signal at T2 time for synchronization purposes. The counter 210 is stepped by the trailing edge of a T3 pulse and the input register 206 is normally cleared in each cycle in response to a T3 pulse.

In response to depression of key 242, flip flop 350 is set. (This flip flop is also set in response to a continue code (42).) An output level is generated applied to AND circuit 360 and if no card reader is on (indicated by an absence of a signal on line 296 indicative of the set condition of a flip flop 292), an output signal is applied on line 362 which is applied via cable **214*c* and line 294 to set the control flip flop 292 in the first card reader 202A. The setting of the control flip flop 350 also conditions AND circuit 364 and if the calculator is not busy signal is present on line 366, the AND circuit has an output which is applied through switch 248 to enable the timing chain 342 to step in response to oscillator 340 and produce the series of timing pulses T1–T4. In response to each T2 pulse, the control flip flops 350–358 are sampled; in response to the T3 pulse the input register 206 is cleared; and in response to the trailing edge of each T3 pulse, the seven stage counter 210 is stepped. Thus in normal operation, the output signals of counter 210 are applied over cable lines 214*a* to the card reader input lines 270, 278, and 286 to energize a particular address from which a data item is read out through OR circuit 290 to set the six flip flops in the input register 206. The calculator responds to the contents of the input register, stopping the timing chain 342 where necessary. When the calculator operation is complete, the timing chain resumes generation of output pulses and the program counter 210 continues to step through its eighty steps or until a stop code (26) is detected. When the stop code is detected, the main control flip flop 350 is turned off in response to the T2 pulse. If no stop code is detected, the program counter steps through the eighty card reader addresses and at the last address produces an output pulse on line 368 which is applied over cable 214*b* to clear all the card reader control flip flops 292 via line 297. The set flip flop 292 produces an output transition in response to this clearing signal on line 298 which is applied via output connector transition cable 216*c* to the input line 294 of the next card reader to set its control flip flop 292 and energize its diode decoding network and readout circuits. As the counter 210 is in reset condition, the data item stored at the first address of the second card reader 202*b* is read into the input register 206 for control of the calculator 198**.

This calculator system can also execute subroutines in response to data items coded on the cards 46. A search code (52) or search and return code (53) initiates a search for the data item specified in the next address of a program following the search code. That data item is held in the input register 206 and a search for a mark code (54) is made with the data item following each detected mark code being compared with the date item held in the input register. On comparison the search operation is terminated and program operations resumed from that point. With reference to FIG. 10, in response to either a search or search and return code flip flop 352 is set at T2 time removing a conditioning level (after a one cycle synchronizing delay diagrammatically indicated by 370 effective only to delay removal of the conditioning level), from gate 372 so that the data item following the search and return code is held in the input register 206. The program counter 210 continues to be stepped however and in each cycle the contents of the input register 206 are compared by comparator 374 with the data item at the sensed card reader address. When a mark code is sensed (54) flip flop 356 is set, conditioning gate 376. The flip flop 356 is cleared automatically in the next cycle so that if comparator 374 does not produce an output which is pased by gate 376, the search continues. If however a comparison was made search flip flop 352 is cleared at T2 time permitting clearing of the input register 206 and reading of subsequent data items into it to continue execution of the program from the program address then specified by counter 210.

If the search and return code (53) was decoded, in addition to setting flip flop 352, gate 346 is conditioned to store the contents of the program counter 210 in storage register 344 and also signals are passed on lines 302 (via cable **214*b*) to store the setting of card reader control flip-flops 292 in their storage flip flops 300. When a return code (55) is detected (after completion of a search operation) flip flop 354 is set, conditioning gate 348 to reset program counter 210 to its previous address and via cable 214*b* and lines 304 resetting all the card reader control flip flops 292 to their previous settings so that the program is immediately returned to the address following the search code that initiated the branch in the program. The flip flop 354 is automatically reset in the next cycle of the timing chain 342. Thus a branch operation is initiated by the setting of flip flop 352 (in response to codes (52) or (53) or depression of key 244 followed by keying of any other code into register 206). The data item following the setting of flip flop 352 is stored in register 206, all calculator operations cease, and the program counter 210 is stepped at regular intervals to sequence through the program specified by the cards 46 in readers 202. As each mark code (54) is detected, flip flop 356 is set, conditioning gate 376. If the next data item read from the program compares satisfactory with the data item stored in register 206, flip flop 352 is reset and the program resumes calculator control from that point. Should a satisfactory comparison not result the search will continue with flip flop 352 remaining set and flip flop 356 being cleared. The sequence is repeated at each mark code (54) until a satisfactory comparison is made at which point calculator operations resume. When a return code (55) is detected the program counter 210 and the card readers 202** are immediately reset to the address following a branch (search and return) code that was previously decoded. The logic thus permits the calculator to perform subroutines with branch addresses identified by data items.

Other operations permited by keyboard controls includes insertion of a particular code specified by the setting of switches 258 into the input register 206 in response to depression of button 256. In a program check operation the circuits, including the program counter 210, are cleared by depression of the prime key 263; and in response to depression of pushbutton 254, control flip flop 358 is set. In this mode a decimal addition of all the octal data items on a card is made and displayed on the display unit 224. In sequence, logic unit 382 (conditioned by set flip flop 358 and gate 380) causes the three most significant bits of the first data item code to be converted to octal form by encoder 384 and entered into the calculator as an octal entry in response to output 386 of logic unit 382 which conditions gate 388; the three least significant bits of that data item code to be converted to octal form and entered into the calculator as a second data entry in response to output 390 which conditions gate 392; and these two numbers are added to the contents of the work register in the calculator by a decimal add code (07) applied via gate 394 conditioned by output 396. The operative card reader 202 is then stepped (line 398) and the data entry sequence is repeated. During this operation, the normal input register input channel is blocked as gate 400 is inhibited and the octally encoded portions of data items and the add codes are transferred through the input register and entered into the calculator at each T2 time. The input register 206 is reset at each T3 time but the program counter is stepped only every third cycle. This sequence continues for eighty steps, the output signal from counter 210 on line 368 causing the control flip flop 358 to be cleared and terminating this verifying program operation with the decimal sum of the octal codes (contents of the calculator's work register) displayed by display unit 224.

Thus the verifying operation provides a check on the accuracy of the program on the card and after that accuracy has been established, the proper placement of the record 46 in the reader 206. For example, if one of the contacts in the card reader 206 had not been completed where a hole was punched in the card, the sum displayed by display unit 224 would not correspond with the predetermined sum, thus providing an immediate indication of fault.

With the switch 248 (shown in FIG. 10 in automatic position) is in its other (step) position, automatic stepping of the timing chain 342 is interrupted by removal of the conditioning level applied by AND circuit 364. That conditioning level is applied to flip flop 402 and the card reader and other components may be operated for one step by depression of key 246 which applied a stepping signal through synchronizing flip flops 404 and 402 to permit the timing chain 342 to generate one sequence of control signals T1–T4.

Figure 11:
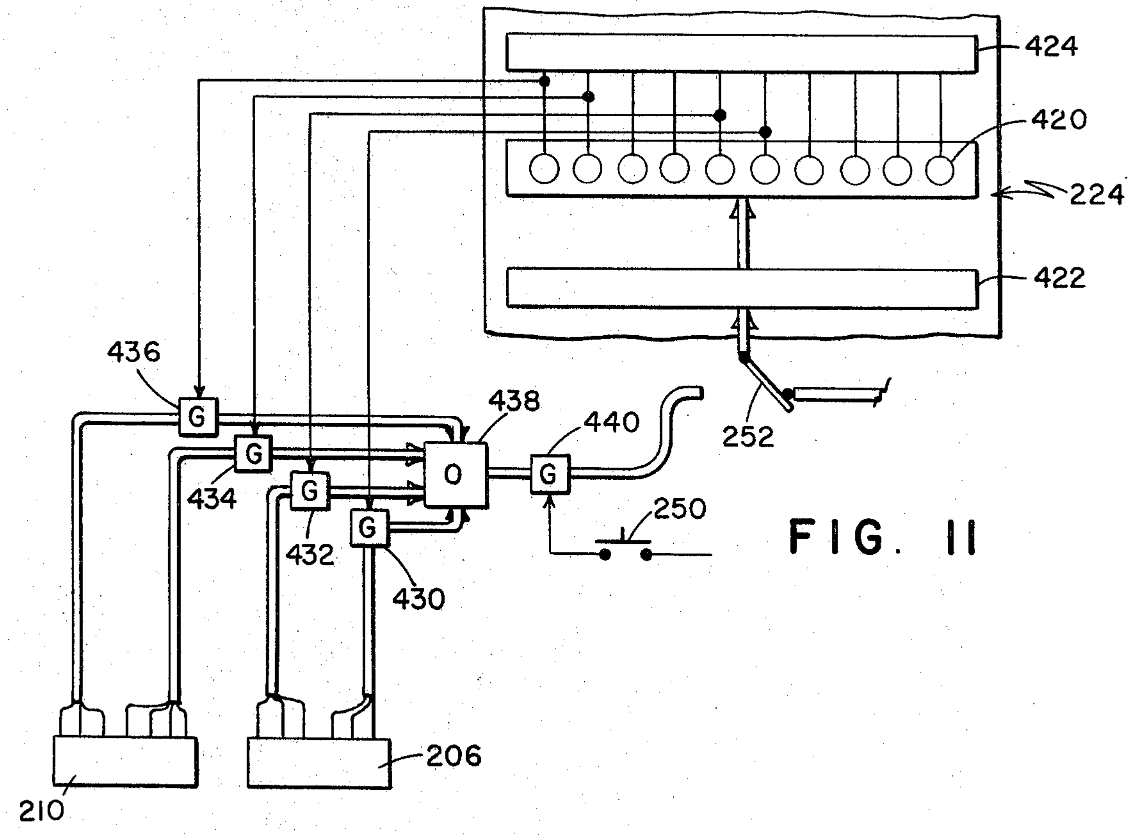
FIG. 11 is a block diagram of another portion of the logic included in the keyboard unit of the system shown in FIG. 7.

Another operation that is permitted by the keyboard controls responds to key 250 when switch 252 is in the display program position. Normally switch 252 is in the display work register position and displays the contents of the work register in calculator 198. An understanding of details of the display unit 224, as indicated in FIG. 11, may be had with reference to FIG. 14 and the corresponding description in the co-pending application Ser. No. 588,863. As there described, this display unit includes a series of indicator tubes 420, in which the corresponding cathodes of all of the indicator tubes are energized simultaneously in accordance with information from encoder 422 (which is normally supplied with information from the calculator 198 via switch 252) and the one anode corresponding to a particular digit position whose data is supplied to encoder 422 is energized in accordance with the output of decoder 424. The data applied to encoder 422 and the indicator tube anodes are energized sequentially in a scan pattern that is sufficiently rapid so that the full number appears to be continuously displayed. Associated with this circuitry are four gates 430–436, an OR circuit 438 and a gate 440. Connected to the conditioning inputs of gate 430 are the three least significant stages of input register 206; and connected to the conditioning inputs of gate 432 are the three most significant stages of register 206. Similarly connected to the conditioning inputs of gate 434 are the four least significant stages of counter 210; and connected to the conditioning inputs of gate 436 are the three most significant stages of that counter. Gate 430 is sampled at the fifth digit position display time; gate 432 is sampled at the sixth digit position display time; gate 434 is sampled at the ninth digit position display time; and gate 436 is sampled at the tenth digit position display time. The outputs of the gates 430–436 are applied through OR circuit 438 to gate 440 which is conditioned when key 250 is depressed. With switch 252 in the display program position, this octal data is applied to the binary decimal decoder 422 and the decoded output is applied to all of the cathodes of the indicator tubes 420. The information channelled by encoder 422 is displayed only by the indicator tube 420 whose anode is energized at that time, however. Thus in this mode the setting of counter 210 and the data item in the instruction sequence specified by the card 46 in the operative card reader 202 (via input register 206) is displayed in octal form by display unit 224.

While particular embodiments of the invention have been shown and described, various modifications thereof will be apparent to those skilled in the art and therefore it is not intended that the invention be limited to the disclosed embodiments or to details thereof and departures may be made therefrom within the spirit and scope of the invention as defined in the claims.

What is claimed is:

1. Apparatus for manipulating data comprising:

input means having a plurality of manually actuable control elements including ten manual control keys representing numerical values from 0 through 9, input register means for accumulating a numerical value entered by said control keys, an arithmetic unit coupled to said input register means for manipulating the numerical value in said input register means in response to instructions entered by certain of said manually actuable control elements, a record receiving device for receiving a record having data items recorded thereon in predetermined, discrete, coordinately related locations, certain of said data items providing the same arithmetic unit control instructions as arithmetic unit control instructions provided by certain of said manually actuable control elements, data item sensing means in said record receiving device, said data item sensing means being coupled to said arithmetic unit, said record receiving device including a control for rendering said data item sensing means operative, means to connect another record receiving device in series with said record receiving device, and means responsive to the completion of the sensing of a record in said device for rendering the next device in series operative for sensing data items on the record in said next device, control means for causing said sensing means to sense sequentially data items recorded on said record and provide output signals representative of the sensed data item on the record disposed on said device for control of said arithmetic unit, means responsive to one of said data item output signals to cause said control means to deactuate said data item sensing means, and means responsive to one of said manually actuable control elements to cause said control means to actuate said data item sensing means.

2. Apparatus for manipulating data comprising:

input means having a plurality of manually actuable control elements including ten manual control keys representing numerical values from 0 through 9, input register means for accumulating a numerical value entered by said control keys, an arithmetic unit coupled to said input register means for manipulating the numerical value in said input register means in response to instructions entered by certain of said manually actuable control elements, a record receiving device for receiving a record having data items recorded thereon in predetermined, discrete, coordinately related locations, certain of said data items providing the same arithmetic unit control instructions as arithmetic unit control instructions provided by certain of said manually actuable control elements, data item sensing means in said record receiving device, said data item sensing means being coupled to said arithmetic unit, control means for causing said sensing means to sense sequentially data items recorded on said record and provide output signals representative of the sensed data item on the record disposed on said device for control of said arithmetic unit, means responsive to one of said data item output signals to cause said control means to deactuate said data item sensing means, means responsive to one of said manually actuable control elements to cause said control means to actuate said data item sensing means, and program display means responsive to one of said manually actuable control elements for displaying the numerical value of the address setting of said control means and the numerical value of the data item at that address in the record stored in said record receiving device.

3. Apparatus for manipulating data comprising:

input means having a plurality of manually actuable control elements including ten manual control keys representing numerical values from 0 through 9, input register means for accumulating a numerical value entered by said control keys, an arithmetic unit coupled to said input register means for manipulating the numerical value in said input register means in response to instructions entered by certain of said manually actuable control elements, a record receiving device for receiving a record having data items recorded thereon in predetermined, discrete, coordinately related locations, certain of said data items providing the same arithmetic unit control instructions as arithmetic unit control instructions provided by certain of said manually actuable control elements, data item sensing means in said record receiving device, said data item sensing means being coupled to said arithmetic unit, control means for causing said sensing means to sense sequentially data items recorded on said record and provide output signals representative of the sensed data item on the record disposed on said device for control of said arithmetic unit, means responsive to one of said data item output signals to cause said control means to deactuate said data item sensing means, means responsive to one of said manually actuable control elements to cause said control means to actuate said data item sensing means, and a program verifying control responsive to one of said manually actuable control elements to sense all the data items on a record in said record receiving device and produce an output verification signal as a result of said sensing operation.

4. The apparatus as claimed in claim 3 wherein said program verifying control includes means to add the numerical values of all the data items on the record in said record receiving device and said apparatus further includes means to display the numerical sum of those data items.

5. An electronic calculator system comprising an arithmetic unit for processing numerical values in accordance with instructions, input means having a plurality of manually actuable control elements including ten manual control keys representing numerical values from 0 through 9 and a plurality of manual control keys representing control instructions, an input register coupled between said input means and said arithmetic unit for accumulating signals representing a numerical value or an instruction generated by actuation of one of said control keys, a plurality of record receiving devices, each record receiving device being arranged to receive a record having data items recorded thereon in predetermined, discrete, coordinately related locations, certain of said data items providing the same arithmetic unit control instructions as arithmetic unit control instructions provided by certain of said manually actuable control elements, data item sensing means in said record receiving device, control means for causing said sensing means to sense sequentially data items recorded on said record and provide output signals representative of the sensed data item on the record disposed on said device for control of said arithmetic unit, means responsive to one of said data item output signals to cause said control means to deactuate said data item sensing means, means responsive to one of said manually actuable control elements to cause said control means to actuate said data item sensing means, a plug connection for pluggably connecting a record receiving device to said input register, each said record receiving device including first and second plug connections so that said plurality of record receiving devices may be pluggably connected together in series, each said plug connection including a channel for transmission of signals representative of sensed data to said input register and a channel for transmission of signals representative of control information from said control means, and interlock means in each said record receiving device responsive to said control means for enabling only one of the record receiving devices at a time to provide output signals for control of said arithmetic unit.

6. An electronic calculator system comprising an arithmetic unit for processing numerical values in accordance with instructions, input means having a plurality of manually actuable control elements including ten manual control keys representing numerical values from 0 through 9 and a plurality of manual control keys representing control instructions, an input register coupled between said input means and said arithmetic unit for accumulating signals representing a numerical value or an instruction generated by actuation of one of said control keys, a record receiving device for receiving a record having data items recorded thereon in predetermined, discrete, coordinately related locations, certain of said data items providing the same arithmetic unit control instructions as arithmetic unit control instructions provided by certain of said manually actuable control elements, data item sensing means in said record receiving device, control means for causing said sensing means to sense sequentially data items recorded on said record and provide output signals representative of the sensed data item on the record disposed on said device for control of said arithmetic unit, means responsive to one of said data item output signals to cause said control means to deactuate said data item sensing means, means responsive to one of said manually actuable control elements to cause said control means to actuate said data item sensing means, means for pluggably connecting said record receiving device to said input register, means for pluggably connecting a second record receiving device to said input register, interlock means in each said record receiving device responsive to said control means for enabling only one of the record receiving devices at a time to provide output signals for control of said arithmetic unit and means responsive to an end of record signal from said control means for setting the interlock device in one record receiving device and releasing the interlock device in another record receiving device so that said control means causes the sensing means in said another device to provide output signals for control of said arithmetic unit.

7. An electronic calculator system comprising an arithmetic unit for processing numerical values in accordance with instructions, input means having a plurality of manually actuable control elements including ten manual control keys representing numerical values from 0 through 9 and a plurality of manual control keys representing control instructions, an input register coupled between said input means and said arithmetic unit for accumulating signals representing a numerical value or an instruction generated by actuation of one of said control keys, a record receiving device for receiving a record having data items recorded thereon in predetermined, discrete, coordinately related locations, certain of said data items providing the same arithmetic unit control instructions as arithmetic unit control instructions provided by certain of said manually actuable control elements, data item sensing means in said record receiving device, control means for causing said sensing means to sense sequentially data items recorded on said record and provide output signals representative of the sensed data item on the record disposed on said device for control of said arithmetic unit, means responsive to one of said data item output signals to cause said control means to deactuate said data item sensing means, means responsive to one of said manually actuable control elements to cause said control means to actuate said data item sensing means, means for pluggably connecting said record receiving device to said input register, means for pluggably connecting a second record receiving device to said input register, interlock means in each said record receiving device responsive to said control means for enabling only one of the record receiving devices at a time to provide output signals for control of said arithmetic unit, and program display means responsive to one of said manually actuable control elements for displaying the numerical value of the address setting of said control means and the numerical value of the data item at that address in the record stored in said record receiving device.

8. An electronic calculator system comprising an arithmetic unit for processing numerical values in accordance with instructions, input means having a plurality of manually actuable control elements including ten manual control keys representing numerical values from 0 through 9 and a plurality of manual control keys representing control instructions, an input register coupled between said input means and said arithmetic unit for accumulating signals representing a numerical value or an instruction generated by actuation of one of said control keys, a record receiving device for receiving a record having data items recorded thereon in predetermined, discrete, coordinately related locations, certain of said data items providing the same arithmetic unit control instructions as arithmetic unit control instructions provided by certain of said manually actuable control elements, data item sensing means in said record receiving device, control means including a counter for causing said sensing means to sense sequentially data items recorded on said record and provide output signals representative of the sensed data item on the record disposed on said device for control of said arithmetic unit, means responsive to one of said data item output signals to cause said control means to deactuate said data item sensing means, means responsive to one of said manually actuable control elements to cause said control means to actuate said data item sensing means, means connecting said record receiving device to said input register, means connecting a second record receiving device to said input register, interlock means responsive to said control means for enabling only one of the record receiving devices at a time to provide output signals for control of said arithmetic unit, and storage means responsive to a first control instruction for storing the setting of said counter and said interlock means and means responsive to a second control instruction for resetting said counter and said interlock means in accordance with data in said storage means.

9. The electronic calculator system as claimed in claim 5 and further including display means coupled to said input register and means responsive to one of said manual keys for displaying the setting of said control means and the value of the data item on the record in said record receiving device at the location specified by the setting of said control means.

10. The apparatus as claimed in claim 9 and further including a program verifying control responsive to one of said manually actuable control elements to sense all the data items on a record in said record receiving device and produce an output verification signal as a result of said sensing operation.

11. The electronic calculator system as claimed in claim 9 and further including display means coupled to said arithmetic unit and wherein said program verifying control includes means for causing said control means to operate said data item sensing means to sequentially apply output signals representative of all the data items on the record disposed on said device to said arithmetic unit and to energize said display to display the result of the operation of said arithmetic unit on said output signals in a checking operation.

12. The electronic calculator system as claimed in claim 5 wherein each said record receiving device includes a control for rendering its data item sensing means operative, and further including means responsive to the completion of the sensing of a record in an operative device to render the next device in said series operative for the sensing of data items on the record in said next device.

13. The electronic calculator system as claimed in claim 12 wherein data is stored on said record in the form of apertures at selected ones of said predetermined locations and each said data item sensing means in each said record receiving device includes a first circuit element for location on one side of a record positioned on said device and a second circuit element for location on the opposite side of said record so that a circuit is completed between said elements of said data item sensing means only when said record has an aperture at the locations corresponding to that data item sensor.

14. The apparatus as claimed in claim 13 wherein each of said first circuit elements is a contact, the surface of which is flush with a record receiving surface of said device, and each of said second circuit elements is a resilient contact member adapted to engage a corresponding one of said first contact members to complete a circuit therebetween.

15. The apparatus as claimed in claim 14 wherein said first circuit elements are disposed on a face of a base component of a record receiving device, and said second circuit elements are disposed on a face of a cover component of said record receiving device adapted to be positioned in juxtaposition to said base face, and further including a separate group of first circuit elements disposed on one of said device components in a column adjacent the matrix of data item sensors, a corresponding group of second circuit elements disposed on the other of said device components in a column for cooperation with said second group of first circuit elements, and record positioning means projecting from said base component for properly positioning a record relative to said matrix of data item sensors, said cover component being arranged to receive said record positioning means to permit said base and cover components to be disposed parallel and in close proximity to one another when said record receiving device is in closed position.

References Cited

UNITED STATES PATENTS

| | | | |
|---|---|---|---|
| 2,878,872 | 3/1959 | Burns et al. | 235—61.113 |
| 2,971,693 | 2/1961 | Dobberstein et al. | 235—61.113 |
| 3,000,555 | 9/1961 | Innes | 235—61.6 |
| 3,017,082 | 1/1962 | Riddiford et al. | 235—61.111 |
| 3,024,989 | 3/1962 | Papo et al. | 235—61.7 |
| 3,158,419 | 11/1964 | Meyer et al. | 235—61.111 |
| 3,197,618 | 7/1965 | Stanley et al. | 235—61.6 |
| 3,335,407 | 8/1967 | Lange et al. | 235—61.6 |

DARYL W. COOK, Primary Examiner

U.S. Cl. X.R.

340—172.5